United States Patent [19]

Goldstein

[11] Patent Number: 4,561,272

[45] Date of Patent: Dec. 31, 1985

[54] PADLOCK SHACKLE

[75] Inventor: David Goldstein, Adelphi, Md.

[73] Assignee: The United States of America as represented by the Secretary of the Navy, Washington, D.C.

[21] Appl. No.: 627,936

[22] Filed: Jul. 5, 1984

[51] Int. Cl.[4] .......................... E05B 15/16; B32B 15/04

[52] U.S. Cl. .......................................... 70/417; 70/24; 428/627; 428/660

[58] Field of Search ............... 70/18, 24, 417; 109/80, 109/82, 84; 428/960, 627

[56] References Cited

U.S. PATENT DOCUMENTS

| | | | |
|---|---|---|---|
| 3,205,841 | 9/1965 | Schwayder | 109/82 |
| 3,552,938 | 1/1971 | Draca | 428/627 X |
| 3,660,082 | 5/1972 | Negishi et al. | 428/960 X |
| 3,723,077 | 3/1973 | Frehn | 109/82 X |
| 3,777,517 | 12/1973 | Schwayder et al. | 70/417 X |
| 3,918,138 | 11/1975 | Nemeth et al. | 428/928 X |
| 3,976,434 | 8/1976 | Schwayder | 70/417 X |
| 4,161,207 | 7/1979 | Fluckiger et al. | 428/627 X |
| 4,374,900 | 2/1983 | Hara et al. | 428/627 X |
| 4,411,960 | 10/1983 | Mizuhara | 428/627 X |

*Primary Examiner*—Robert L. Wolfe
*Assistant Examiner*—Russell W. Illich
*Attorney, Agent, or Firm*—Robert F. Beers; Kenneth E. Walden; Roger D. Johnson

[57] ABSTRACT

A padlock shackle made of an inner core of ductile nickel-titanium alloy, an outer casing of hardened stainless steel, and an intermediate layer of a composite of tungsten carbide particles in a nickel-titanium alloy matrix which is bonded to the nickel-titanium alloy core and mechanically bonded to the stainless outer casing.

4 Claims, 5 Drawing Figures

PADLOCK SHACKLE

BACKGROUND OF THE INVENTION

This invention relates to padlocks and more particularly to shackles for padlocks.

Conventional high security commercial locks exhibit good properties such as resistance to bolt cutters, resistance to chemical attack, ductility over wide range of temperatures, etc. The shackles of these locks are generally made of a single metal or alloy material such as hardened stainless steel.

Unfortunately, the recently introduced carbide toothed saws, such as the Grit Edge® rod saw made by the Remington Arms Company, easily cut through these monolithic metals or alloy materials.

It would be desirable therefore, to provide a padlock shackle which would be resistant to carbide toothed saws. The shackle should also be resistant, chemical attack, ductile over a wide temperature range, and inexpensive to manufacture.

SUMMARY OF THE INVENTION

Accordingly an object of this invention is to provide a new type of padlock shackle.

Another object of this invention is to provide a padlock shackle which is resistant to carbide toothed saws.

A further object of this invention is to provide an inexpensive padlock shackle which is resistant to carbide toothed saws and chemical attack.

Yet another object of this invention is to provide a new method of manufacturing a new type of padlock shackle.

These and other objects of this invention are achieved by providing a padlock shackle made of an inner core of ductile Nitinol alloy, an outer casing of hardened stainless steel, and an intermediate layer of a composite of from 20 to 33 volume percent of tungsten carbide particles of from more than 0.6 mm to less than 2.0 mm in size with the remainder of the composite being essentially a matrix of a nickel-titanium alloy wherein nickel comprises from 53 to 62 weight percent of the alloy with the remainder of the alloy being essentially titanium.

BRIEF DESCRIPTION OF THE DRAWINGS

A more complete understanding of the invention and a fuller appreciation of the many attendant advantages thereof will be readily derived by reference to the following detailed description when considered in connection with the accompanying drawings, wherein.

DETAILED DESCRIPTION OF THE PREFERRED EMBODIMENT

Note: the following shorthand notations are used in this discussion of the preferred embodiment:

WC will represent tungsten carbide which contains a percentage of cobalt for toughness.

NiTi represents nickel-titanium alloys which are commonly referred to as Nitinol alloys. This abbreviation will include alloys containing from 53 to 62, or preferably from 54 to 58, or most preferably about 55 weight percent of nickel with the remainder of the alloy being essentially titanium.

Mesh as used here refers to standard mesh or standard sieve number. The Handbook of Chemistry and Physics 61st ed. 1980–81, page F-161, provides a table listing standard sieve numbers (mesh) versus size in mm or microns.

WC edged saws easily cut through conventional single metal or alloy padlock shackles. This invention provides a composite padlock shackle which is resistant to WC edged saws and similar saws. For instance, a ½ inch diameter bar of the composite material can be sawed to a 1/16 inch depth with a WC edged saw (Grit Edge® saw, Remington Arms Company) but then becomes very resistant to further cutting.

Figure 1:
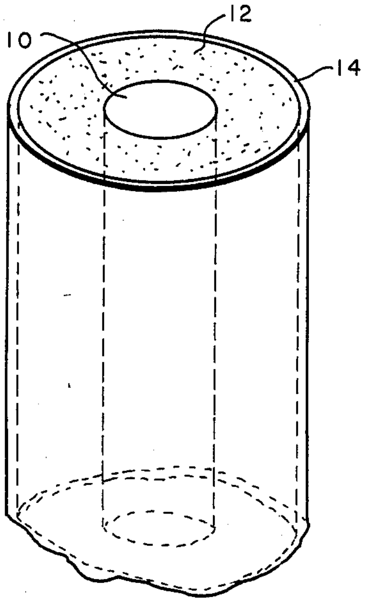
FIG. 1 shows the basic composite structure of the shackle bar.

Referring to FIG. 1, the basic composite structure of the shackle comprises a ductile NiTi alloy rod 10 which is surrounded by and bonded to a composite material 12 which comprises WC particles in a NiTi alloy matrix. The composite material 12 is surrounded by and mechanically bonded to an outer casing 14 of hardened stainless steel.

The choice of particulates for the composite 10 was limited to borides and carbides by the high hardness required. Moreover, in order to produce relatively inexpensive shackles, fabrication costs must be minimized. Based on this, titanium carbide and tungsten carbide were initially selected. Unfortunately, composites of titanium carbide in NiTi alloy (Nitinol) matrixes fail to provide adequate resistance to WC edge saws. However, tests show that composites of WC particles in a tough, ductile NiTi matrix defeat the WC edged saws.

Therefore, the composite material 12 in FIG. 1 comprises WC particles in a NiTi alloy matrix. From 20 to 33 volume percent of the composite is WC particles, with the remainder of the composite being a matrix of essentially NiTi alloy comprising from 53 to 62, and preferably from 54 to 58, and most preferably about 55 weight percent nickel, with the remainder of the alloy being essentially titanium. The NiTi alloy wets and bonds well to the WC particles and forms a tough, ductile matrix. The composite is easily hot worked and shaped. The WC particles are from more than 0.6 mm to less than 2.0 mm (−10 +30 mesh) size.

The stainless steel outer casing 14 is designed to protect against chemical attack and bolt cutters. Selection of the stainless steel material is critical to resistance against bolt cutters. For instance, a ½ inch composite bar fabricated with an outer casing of AISI 304 stainless steel can be cut with a 24-inch bolt cutter. It is well known that the defeat of bolt cutters is achieved by fracturing their cutting edges. Case hardening is required to achieve this. In view of this, a promising material for the outer casing is Class A 286 (a variant of class 310) stainless steel. This material has good hot strength, good cryogenic ductility, and can be work hardened and aged to $R_c$ 45 hardness.

It should be emphasized that the novel feature of the present invention lies in the use of the WC particle/-TiNi alloy composite 21 in the padlock shackle. Selection and testing of stainless steel materials for the outer casing 14 which are resistant to bolt cutters lies routinely in the state of the prior art. Even without such a material, padlock shackles according to the present invention offer improved protection where the shackle can be reached by a saw blade but not a bolt cutter.

A bar of WC particles/NiTi alloy encased in stainless steel was fabricated and hot worked into a U-shape. No fractures were detected. However, when the bar was struck several times with a ball peen hammer it broke. This problem was corrected by using a tougher grade of WC particles containing 12 weight percent cobalt and (see FIG. 1) by incorporating a tough, ductile NiC core rod 10 within the WC particles/NiTi alloy composite 12. Preferably the WC particles contain 11 to 14 percent of cobalt.

Figure 2:
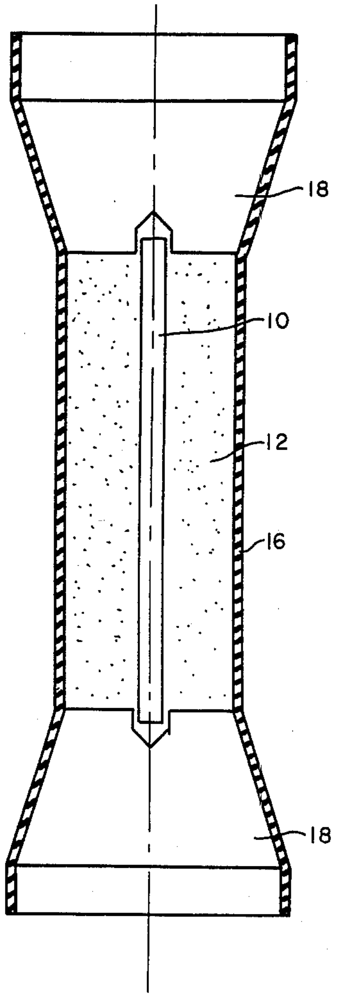
FIG. 2 shows the Nitinol core and surrounded by the tungsten carbide/Nitinol powder mix in a rubber mold ready for cold isostatic pressing to form a green preform of a shackle.

Referring to FIG. 2, a mixture of the WC particles and NiTi alloy particles 12 is placed around a NiTi alloy core rod 10 in a flexible container 16 (i.e., elastomeric dam). Rubber stoppers 18 seal the container 16 and hold the NiTi core rod 10 in place. The WC particles are from more than 0.6 to less than 2.0 mm (−10 +30 mesh) in size. The WC particles are considerably more dense than the nickel-titanium alloy particles, and they tend to separate out during the blending step. As a result, it is preferably to use a mixture of large and small nickel-titanium particles, with the small particles comprising from 50 to 70 volume percent and the large particles the remainder. The large particles are flakes of up to ¼ inch in length by less than 0.002 inches thick. The small particles are −60 mesh (less than 0.25 mm) and preferably −100 mesh (less than 0.149 mm) in size. The flakes by interlocking trap and keep the much heavier WC particles from separating out. The small nickel-titanium alloy particles fill in the space left between the large particles. Note that after the hot working step, the nickel-titanium alloy will be in the form of a single metal matrix. The mixture of particles 12 is cold isostatically pressed to form a green preform with the NiTi rod 10 in its center. The cold isostatic pressing is accomplished by putting the stopped flexible container in a hydraulic fluid (e.g., oil) medium at high pressure. An isostatic pressure of 60,000 psi produces poor results; 80,000 psi, fair results; and 120,000 psi, excellent results. The isostatic pressure applied in this step is 100,000 psi or more, and preferably 120,000 psi or more. The upper limit of pressure applied is limited by practical factors such as costs, limits of the equipment, etc.

Figure 3:
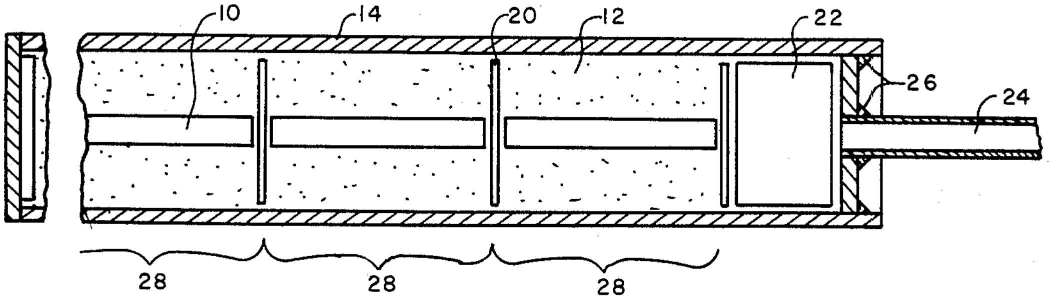
FIG. 3 shows an assemble of green preforms of shackles in a sealed stainless steel can ready for hot swagging.

Referring to FIG. 3, the green composite 28 comprising the compressed TiC/NiTi powder 12 and NiTi core rod 10 is placed inside of a stainless steel can 14. Note that the stainless steel can 14 will form the outer casing of the shackle. As FIG. 3 illustrates a number of preform assemblies 28 are placed in the stainless steel can 14 and are separated by mild spacers 20. A steel plug 22 is placed in the can 14 at the open end. The can 14 is welded (welds 26) shut and evacuated by a mechanical vacuum pump through the evacuation tube 24 to a pressure of less than 100 microns and preferably less than 25 microns. The evacuation tube 24 is then welded shut to seal the can.

Figure 4:
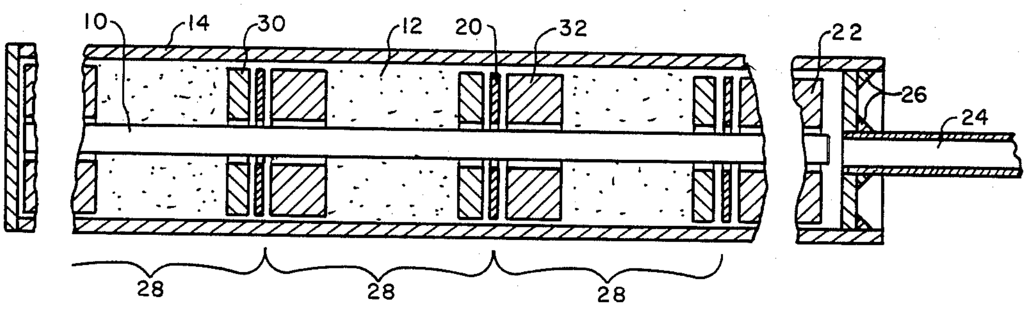
FIG. 4 is similar to FIG. 3, with stainless steel heel and toe plugs included with the green preforms.
Figure 5:
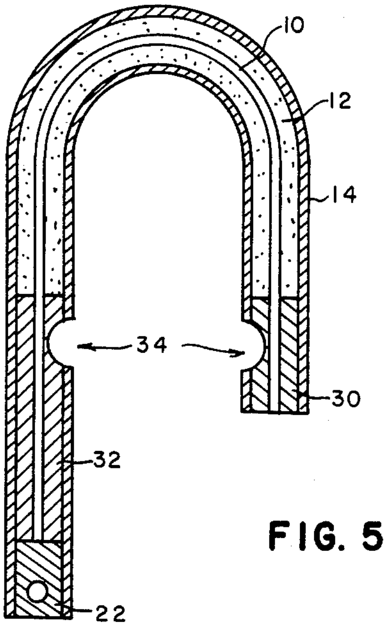
FIG. 5 shows the finished shackle.

FIG. 4 shows a set up similar to that shown in FIG. 3 in which identical numbers reference identical parts. In addition, a stainless steel toe plug 30 and a stainless steel heel plug 32 is included in each preform assembly 28.

The sealed can 14 of FIG. 3 or FIG. 4 and its contents are hot worked until a reduction of 50 percent or more, preferably 80 percent or more, in diameter is achieved. This hot working can either be done by swaging at a temperature of from 850° to 950° C. or by extrusion at a temperature of from 1050° to 1090° C. At this time true bonding between the titanium carbide (WC) and the nickel-titanium alloy and 99+ percent of theoretical density is achieved in the WC/NiTi composite 12.

Referring to FIG. 4 (or FIG. 3), the preform assemblies 28 have become by this time the shackle composite rods 28. The stainless steel can is cooled to room temperature and cut into segments at the points where the mild steel spacers 20 are located. Note that the walls of the stainless steel can 14 are mechanically bonded to the WC particles/NiTi alloy composite and form the stainless steel outer casing 14 of FIG. 1.

The general nature of the invention having been set forth, the following example is presented as a specific illustration thereof. It will be understood that the invention is not limited to this specific example but is susceptible to various modification that will be recognized by one of ordinary skill in the art.

EXAMPLE 1

TABLE 1 FABRICATION DETAILS, TEST BAR P-15

20 v/o WC in TiNi

Charge Materials:

WC: 55 grams, density 14.2 g/cc particle size 1.5 mm (0.060-inch)

TiNi core rod: 0.225-inch dia.×2¾-inch length, nominal 55 weight percent Ni, balance Ti composition TiNi powder: 100 grams, comprised of equal weights of −60 mesh and +60 mesh powder, including flake up to 3/16-inch length.

Blending: ½ minute, by hand, in jar.

Rubber Tube: Fisher, 1-inch diameter

Pressing: 120,000 psi, isostatic.

Pressed assembly: ⅞-inch diameter by 2⅝-inch length.

Canning tube: 304 Stainless steel, 1-inch ID, wall ⅛-inch thickness.

Canning Vacuum: 100 microns maximum.

Swaging ratio: Reduction in area, 85% (1.25 to 0.48-inch in diameter).

Swaging temperature: 850° C.

Density: 8.16 g/cc.

Cutting time reported by the U.S. Navy Civil Engineering Laboratory was 0.118 (8/64) inch, including ⅛ inch of stainless outer casing, in 140 seconds. The rod saw was either rotated or replaced at 15 second intervals of actual cutting to provide a fresh cutting surface to the test bar.

Obviously, numerous modifications and variations of the present invention are possible in light of the above teachings. It is therefore to be understood that within the scope of the appended claims the invention may be practiced otherwise than as specifically described herein.

What is claimed as new and desired to be secured by Letters Patent of the United States is:

1. A padlock shackle comprising:

(1) an inner core of ductile nickel-titanium alloy comprising from 53 to 62 weight percent of nickel with the remainder being essentially titanium;

(2) an outer casing of hardened stainless steel; and (3) an intermediate layer of a composite of from 20 to 23 volume percent of tungsten carbide particles from more than 0.6 mm to less than 2.0 mm in size with the remainder of the composite being essentially a matrix of nickel-titanium alloy comprising from 53 to 62 weight percent of nickel with the remainder of the alloy being titanium;

the intermediate composite binding the stainless steel casing to the nickel-titanium core rod.

2. The padlock shackle of claim 1 wherein the inner core of ductile nickel-titanium alloy comprises from 54 to 58 weight percent of nickel with the remainder being essentially titanium.

3. The padlock shackle of claim 1 wherein the WC particles contain from 11 to 14 weight percent cobalt.

4. The padlock shackle of claim 1 wherein the nickel-titanium alloy in the composite layer comprises from 54 to 58 weight percent of nickel with the remainder of the alloy being essentially titanium.

* * * * *